United States Patent [19]
Sasame et al.

[11] Patent Number: 5,204,034
[45] Date of Patent: Apr. 20, 1993

[54] METHOD OF PRODUCING A CLEANING BLADE WITH A LUBRICANT SURFACE

[75] Inventors: Hiroshi Sasame; Takeo Shoji, both of Yokohama; Hiroyuki Adachi, Tokyo; Shinichi Tsukida, Okegawa; Masahiro Watabe; Moriyuki Yanai, both of Yokohama, all of Japan

[73] Assignee: Canon Kabushiki Kaisha, Tokyo, Japan

[21] Appl. No.: 672,909

[22] Filed: Mar. 21, 1991

[30] Foreign Application Priority Data

Mar. 24, 1990 [JP] Japan .................. 2-74208

[51] Int. Cl.$^5$ .............................. B29C 37/02
[52] U.S. Cl. .................... 264/138; 264/236; 264/300
[58] Field of Search ............... 264/129, 130, 131, 341, 264/201, 349, 300, 138, 139, 236, 319; 428/192

[56] References Cited

U.S. PATENT DOCUMENTS

| | | | |
|---|---|---|---|
| 2,644,802 | 7/1953 | Lontz | 264/300 |
| 3,655,829 | 4/1972 | Ronzoni et al. | 264/349 |
| 4,104,351 | 8/1978 | Blizzard et al. | 264/201 |

FOREIGN PATENT DOCUMENTS

| | | |
|---|---|---|
| 0384354 | 8/1990 | European Pat. Off. |
| 0435342 | 12/1990 | European Pat. Off. |
| 2410842 | 9/1974 | Fed. Rep. of Germany |
| 2324749 | 11/1974 | Fed. Rep. of Germany |
| 56-86919 | 7/1981 | Japan |
| 57-64278 | 4/1982 | Japan |
| 58-203480 | 11/1983 | Japan |
| 59-170459 | 8/1984 | Japan |
| 61-048881 | 3/1986 | Japan |
| 61-48882 | 3/1986 | Japan |
| 61-239279 | 10/1986 | Japan |
| 61-255375 | 11/1986 | Japan |
| 1376865 | 12/1974 | United Kingdom |

*Primary Examiner*—Jay H. Woo
*Assistant Examiner*—Robert B. Davis
*Attorney, Agent, or Firm*—Fitzpatrick, Cella, Harper & Scinto

[57] ABSTRACT

A process of producing a cleaning blade including a silicon rubber base and a resin layer which acts as a lubricant on the surface of the rubber is produced by molding a rubber material having resin powder dispersed therein at a temperature less than the softening or melting point of the resin, cutting an end of the rubber, and vulcanizing the molded rubber at a temperature higher than the softening or melting point of the resin. The resin layer is selected from polypropylene, polyvinylidene fluoride, polyethylene, or polyester.

14 Claims, 2 Drawing Sheets

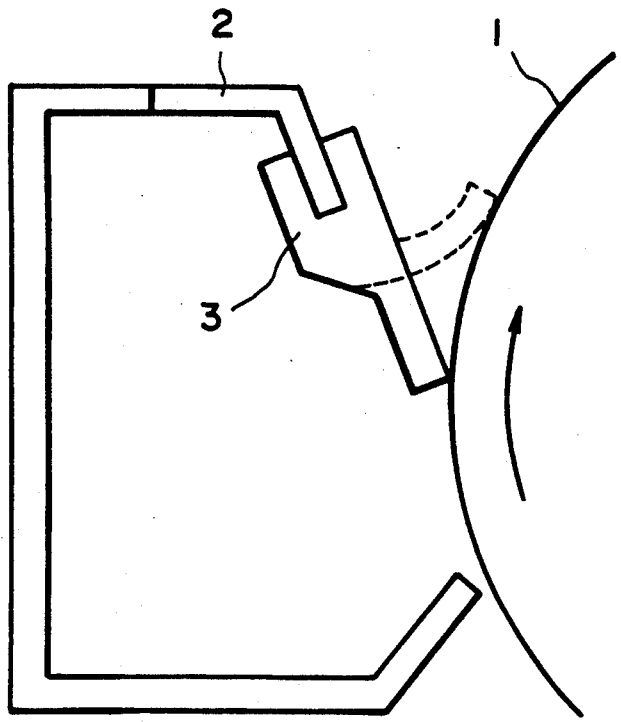
FIG. 3
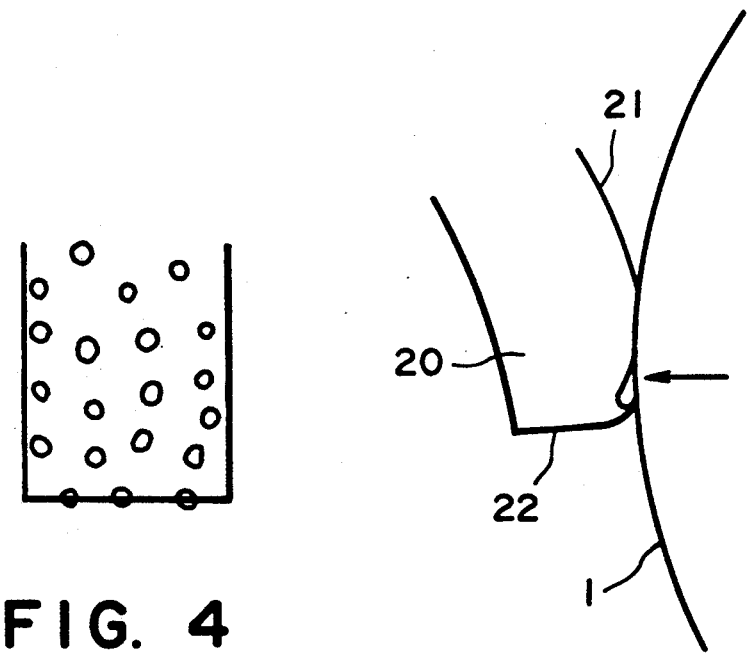
FIG. 4
FIG. 5

METHOD OF PRODUCING A CLEANING BLADE WITH A LUBRICANT SURFACE

BACKGROUND OF THE INVENTION

1. Field of the Invention

The present invention relates to a cleaning blade for use in an image forming apparatus such as an electrophotographic copier, a printer, a facsimile apparatus or the like, and more particularly to a cleaning blade to be maintained in contact with the surface of an image bearing member to be cleaned thereby removing the toner remaining on said surface, and a producing method therefor.

2. Related Background Art

In an image forming apparatus designed to repeat a process of transferring a toner image, formed on the surface of an image bearing member, onto a transfer material such as paper, it is desirable to completely eliminate the untransferred toner remaining on said member after each transfer process, in order to prevent the smearing of the image by the remaining or residual toner at the next transfer process. For this purpose there is widely employed so-called blade cleaning method in which an edge of high precision formed with rubber elastomer is maintained in uniform contact with the surface of the image bearing member to slide on said member, thereby removing the toner remaining thereon. Said rubber elastomer is generally composed of urethane rubber, and thermosetting liquid urethanes are particularly preferred in consideration of the superior abrasion resistance thereof.

However, the cleaning blade composed of urethane rubber generates, because of a high friction coefficient of the urethane rubber, a very high friction force between the blade and the image bearing member in the initial stage of sliding motion when the toner is absent therebetween. Consequently the cleaning blade of urethane rubber may be inverted as indicated by broken lines in FIG. 3 or may bounce on the image bearing member in the initial stage of sliding motion, thereby becoming unable to remove the remaining toner.

In consideration of such situation, there has been proposed and employed a method of reducing the frictional force between the urethane rubber and the image bearing member in the initial stage of the sliding motion, by coating the end portion of the cleaning blade of urethane rubber or the surface of the image bearing member with lubricating powder of fluorinated resin such as polyvinylidene fluoride (PVDF) or polytetrafluoroethylene (PTFE) (hereinafter represented as "lubricant"). However, excessive use of such lubricant may result in smearing of the developing unit or the charging unit, or may deteriorate the image quality because of its electrical properties. It is therefore necessary to obtain uniform coating with a minimum possible amount, but such coating is technically difficult to realize and the obtained blade cannot be fully reliable with respect to the blade inversion or bouncing, due for example to fluctuation in the coating.

In order to resolve this drawback, the Japanese Laid-open Patent No. 61-48881 proposes to disperse the lubricant in the urethane rubber material. However, in a simple dispersion system, the lubricant only locally appears on the surface as shown in FIG. 4, and the inversion or bouncing of the blade cannot be completely prevented as the urethane rubber used as the matrix considerably influences the behavior. Besides the thermosetting liquid urethanes are unsuitable for mass production, since they require a long reaction time for thermosetting and have high reactivity with moisture in the air.

On the other hand, a rubber material of low friction resistance and short reaction time, for example silicon rubber with satisfactory stability in ambient conditions, is effective for preventing the blade inversion or bouncing and is suitable for mass production. However silicon rubber is easily abraded and cannot be used for a long time, since the blade edge is abraded by the friction with the image bearing member or with the toner.

SUMMARY OF THE INVENTION

An object of the present invention is to provide a cleaning blade with improved slidability and a producing method therefor.

Another object of the present invention is to provide a rubber blade in which resin powder is dispersed, and a producing method therefor.

Still another object of the present invention is to provide a silicon rubber blade having a resin coating, and a producing method therefor.

Still another object of the present invention is to provide a cleaning blade formed by vulcanizing rubber, in which resin powder is dispersed, at a temperature higher than the softening point or melting point of the resin, and a producing method therefor.

Still other objects of the present invention will become fully apparent from the following description.

BRIEF DESCRIPTION OF THE DRAWINGS

FIG. 3 is a schematic view showing an inversion phenomenon of the blade;

FIG. 4 is a schematic view showing fine particles dispersed in the blade; and

FIG. 5 is a schematic view showing a contacting part between the blade and the image bearing member.

DESCRIPTION OF THE PREFERRED EMBODIMENTS

Figure 1:
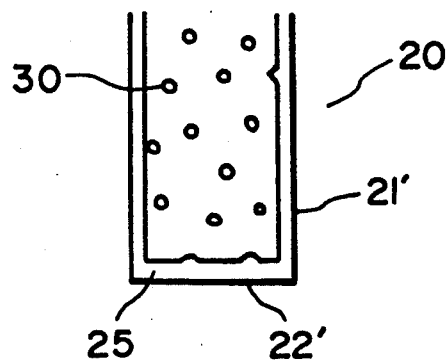
FIG. 1 is a cross-sectional view of a cleaning blade embodying the present invention.

Now the present invention will be clarified in detail by preferred embodiments thereof.

The present inventors have found that the friction coefficient between the contacting surface of the image bearing member with the cleaning blade and an edge forming surface of said blade has a significant influence on the aforementioned inversion or bouncing of the blade, and also on the abrasion or chipping-off of the edge of the blade. More specifically, referring to FIG. 5, if an edge portion 20 of the cleaning blade tends to be turned over while the image bearing member 1 is in motion, a face 22 adjacent to a contacting face 21 of said blade comes into direct contact with said image bearing member 1, thus leading to blade inversion or blade bouncing. Also the abrasion or chipping-off of the edge 20 is principally caused by the stress concentration on the face 22 showing such turning-over. Consequently, in order to prevent the inversion, bouncing, abrasion and chipping-off of the blade, in addition to the prevention of the above-mentioned turning-over phenomenon by a reduction in the friction coefficient of the contact face 21, it is also very effective to reduce the friction coefficient of the face 22 which comes into contact with the image bearing member when the blade tends to be turned over.

The present invention is based on the novel concept mentioned above.

In an embodiment of the present invention, fine particles of lubricating resin, which is not mutually soluble with rubber, are dispersed in a normally liquidous rubber material, and then a rubber member of a desired shape is formed from said rubber material by molding the same in a mold. Said molding of the rubber material is conducted in a condition where said fine particles are not molten but remain dispersed, under a temperature condition $T1<T10<T2$, wherein T1 is the primary vulcanizing temperature at which the molding is conducted, T2 is the heat resistance of the rubber member (corresponding to the decomposition temperature of the constituent molecules, determined in DSC (differential scanning calorimetry) measurement), and T10 is the melting point or softening point (measured by ring-ball method) of the fine particles. The condition $T1<T10$ is preferred for maintaining the uniformly dispersed state of the resin particles in the rubber at the molding operation, since, if the rubber molding temperature T1 is selected to be equal to or higher than T10, the fine particles dispersed in the rubber material are fused at the molding operation so that the mixing state becomes undefined, for example depending on the stress at the molding operation.

Thus, the molded rubber member, containing the fine particles dispersed therein, can improve the abrasion resistance when said member is composed of easily abraded silicon rubber. Therefore improved cleaning ability can be achieved in comparison with the case without using such fine particles.

Then, the thus obtained rubber member is subjected to a secondary vulcanizing, by heating in an oven at a temperature T20, satisfying a condition $T10<T20<T2$. In this operation, the fine particles 30 dispersed at the surface or in the vicinity thereof are fused, thus covering the surface as shown in FIG. 1 because of the lack of mutually solubility with the rubber material, and form a surfacial layer 25 upon subsequent cooling.

As a sufficiently thick resinous coating layer is formed particularly on the face 22' which comes into contact with the image bearing member when the blade starts turning-over, the abrasion or chipping-off of the blade can be prevented even if the blade begins running-over.

As the surface coating of the cleaning blade is achieved by the fine particles present therein as explained above, it is possible to form a sufficiently thick coating also on the edge portion, which is most difficult to coat in case the coating is formed from outside.

In FIG. 1, three faces of the blade are coated by the fine particles 30, but practically acceptable performance can be obtained if the coating is formed at least on the face 21' contacting the image bearing member and the face 22' adjacent thereto.

In the thus obtained cleaning blade 20, the surface characteristics are principally governed by the properties of the initially dispersed fine particles as shown in FIG. 1, so that the inversion, bouncing, abrasion, and chipping-off of the blade can be prevented by the selection of suitable lubricating particles. On the other hand, the elasticity of the entire blade is ensured by the rubber material constituting the matrix. The matrix rubber material, not coming into direct contact with the image bearing member, can be arbitrarily selected from various materials, and can be composed of silicon rubber superior in mass producibility and in elastic properties.

If the cleaning blade is cut, after the removal thereof from the mold, at the edge position (portion to contact the image bearing member) in order to improve the precision of the edge, there will be obtained a section face on which exposed are a number of fine particles dispersed uniformly in the rubber material. Thus, there is securely obtained a thicker coating layer so that the cleaning operation can be achieved in improved manner.

In the following there are shown and evaluated examples of the present invention and reference examples for comparison.

Example 1

Rubber material: addition type liquid silicon rubber
Fine particles: PVDF (particle size 10 μm or less) (melting point 170° C.), 50 parts by weight to 100 part by weight of rubber
Molding conditions:
  Molding was conducted in a rubber injection molder in which a support member was inserted subjected in advance to an adhesion treatment:
  Molding temperature: 140° C.
  Molding time: 150 seconds
After the removal from the mold, the edge portion was cut in a shape shown in FIG. 4, and the secondary vulcanizing was conducted under the following conditions:
  Secondary vulcanizing temperature: 200° C.
  Secondary vulcanizing time: 4 hours
Molded product: rubber hardness JISA 73.

The surfaces were covered with PVDF as shown in FIG. 1, particularly thicker in the cut portion (heat resistance of rubber material: ca. 270° C.).

Example 2

Molding, removal from the mold and cutting of edge portion were conducted with the same materials and conditions as in the Example 1.

Then the secondary vulcanizing was conducted by heating for 60 seconds at 250° C., and then for 4 hours at 200° C.
Molded product: rubber hardness JIS 73

Because of the treatment at high temperature (250° C.), the PVDF particles present relatively deep in the surfacial area emerged to the surface and contributed to the formation of layer, so that the obtained PVDF layer was thicker than in the Example 1.

Example 3

Rubber material: addition type liquid silicon rubber (same as in the Example 1).
Fine particles: crystalline polypropylene; 50 parts by weight to 100 parts by weight of rubber (melting point: 145° C.).
Molding conditions:
  Molding was conducted in a rubber injection molder in which inserted was a support member subjected in advance to an adhesion treatment:
  Molding temperature: 120° C.
  Molding time: 10 minutes
After the removal from the mold, the edge portion was cut in the same shape as in the Example 1, and the secondary vulcanizing was conducted under the following conditions:
  Secondary vulcanizing temperature: 200° C.
  Secondary vulcanizing time: 4 hours
Molded product: rubber hardness JISA 71

A polypropylene layer was formed on the surface in a similar manner as in the Example 1.

Example 4

Rubber material: same as in the Example 3
Fine particles: same as in the Example 3
Molding conditions:
  Molding was conducted in a rubber injection molder in which inserted was a support member subjected in advance to an adhesion treatment:
  Molding temperature: 170° C.
  Molding time: 60 seconds After the removal from the mold, the edge portion was cut in the same shape as in the Example 3, and the secondary vulcanizing was conducted under the following conditions:
  Secondary vulcanizing temperature: 200° C.
  Secondary vulcanizing time: 4 hours.
Molded products: rubber hardness JISA 71

Because the molding temperature was higher than the melting point of the fine particles, the dispersion state thereof became unstable, and the obtained surfacial polypropylene layer showed fluctuation in thickness.

Reference Example 1

Rubber material: thermosetting liquid urethane rubber
Fine particles: none
Molding conditions:
  Molding temperature: 130° C.
  Molding time: 30 minutes
  Secondary vulcanizing temperature: 130° C.
  Secondary vulcanizing time: 4 hours After the secondary vulcanizing, the edge portion was cut in the same shape as in the foregoing examples.
Molded product: rubber hardness JISA 65

Reference Example 2

Rubber material: same as in the Example 1
Fine particles: none
Molding conditions: same as in the Example 1
Molded product: rubber hardness JISA 62.

Evaluation conditions

The blades obtained in the foregoing Examples and Reference Examples were mounted in a copying machine, and subjected to the evaluation of inversion, bouncing, cleaning ability and abrasion resistance under the following conditions:
  Image bearing member: organic photosensitive member
  Process speed: 50 mm/sec.

These performances were evaluated by a durability test of 5,000 copies.

With respect to the blade inversion in the initial stage, since reliability cannot be evaluated in several tests, there was conducted measurement of the friction resistance between each blade and the organic photosensitive member.

Result of evaluation

Figure 2:
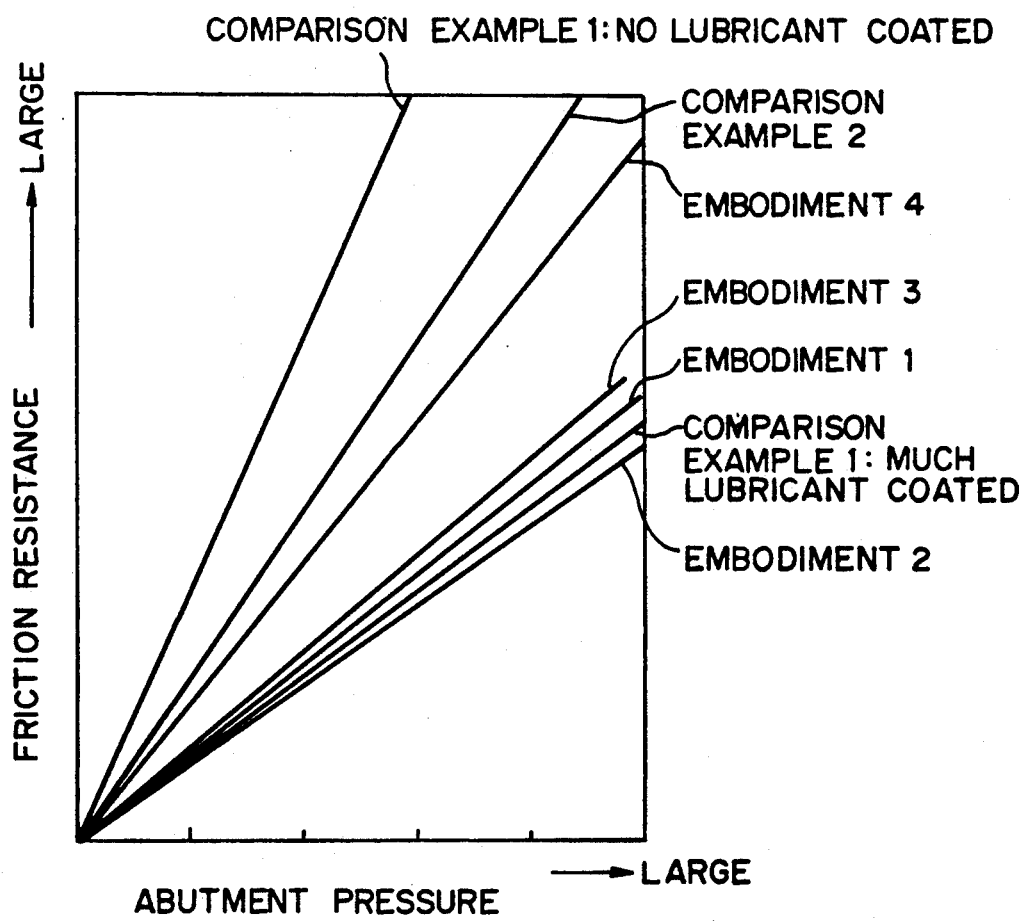
FIG. 2 is a chart showing the relationship between the contact pressure of the blade and the friction resistance thereof.

Table 1 summarizes the results of evaluation, and FIG. 2 summarizes the results of measurement of friction resistance.

TABLE 1

|  | Ex. 1 | Ex. 2 | Ex. 3 | EX. 4 | Ex. 1 no lubricant | Ref. Ex. 1 excessive lubricant | Ref. Ex. 2 |
|---|---|---|---|---|---|---|---|
| Inversion | ○ | ○ | ○ | ○ | X | ○ | ○ |
| Cleaning ability | ○ | ○ | ○ | Δ |  | ○ | X |
| Abrasion | 50 $\mu m^2$ | 25 $\mu m^2$ | 80 $\mu m^2$ | 4500 $\mu m^2$ |  | ca.0 $\mu m^2$ | 6000 $\mu m^2$ |
| Edge chipping-off | none | none | none | present but fewer than in Ref. Ex. 2 |  | none | many |
| Initial imaging ability | ○ | ○ | ○ | ○ |  | X | ○ |

Note
1) Inversion ○ no inversion; X inversion observed;
2) Cleaning ability ○ cleaning satisfactory Δ cleaning slightly unsatisfactory X cleaning unsatisfactory
3) Initial imaging ability ○ satisfactory X image defective due to smearing of charger or developing unit
4) Abrasion area of abraded part on the section of blade As shown in Table 1, the Examples 1 to 4 exhibit satisfactory initial imaging ability, and are improved in the durability.

However, the Example 4 showed fluctuation in the thickness of the surface resin layer, with locally thin parts, so that the improvement in durability is less than that in the Examples 1 to 3. Consequently the rubber molding temperature should preferably satisfy the condition T1<T10 as explained before.

On the other hand, in the Reference Example 1, absence of lubricant on the blade or on the photosensitive member caused inversion of blade, while use of excessive lubricant caused smearing of the charger or the developing unit, leading to defective image. Also the Reference Example 2 exhibited frequent abrasion or chippings of the blade, resulting in unsatisfactory cleaning.

The reliability of blade with respect to the inversion can be judged from the friction resistance shown in FIG. 2, which shows the friction resistance between the blade and the organic photosensitive member in ordinate, as a function of contact pressure in abscissa. The friction resistance in ordinate is represented by a relative value in arbitrary scale.

In FIG. 2, the reference Example 1 "without lubricant" corresponds to a level of causing inversion, as will be apparent from the above-explained results. On the other hand, the Reference Example 1 "with excessive lubricant" employs a large amount of lubricant for preventing the inversion, thus causing defects in the image.

The Examples 1, 2 and 3 are comparable to the Reference Example 1 with excessive lubricant, indicating that they are sufficiently reliable with respect to the blade inversion.

The friction resistance of the Example 4 is higher than that of the Examples 1, 2 and 3 but is lower than that of the Reference Example 1 (no lubricant) or the Reference Example 2.

The Reference Example 2 showed a lower friction resistance than in the Reference Example 1 without lubricant and did not show inversion at the evaluation, but the reliability cannot be said sufficient.

The fine particles of resin to be dispersed need not necessarily be crystalline but can be those with a sharp molecular weight distribution having a clear softening point. Nevertheless, the crystalline particles having a melting point are preferable. In case crystalline resin powder is employed, the rubber molding temperature is preferably selected lower than the melting point and the vulcanizing temperature is preferably selected higher than said melting point as in the foregoing Examples. In case non-crystalline resin powder is employed, the rubber molding temperature is preferably selected lower than the softening point of said resin, and the vulcanizing temperature is preferably selected highter than said softening point.

The fine particles in the foregoing Examples are composed of PVDF or polypropylene, but there may also be employed other materials, such as polyethylene or polyester.

Also the rubber material is not limited to silicon rubber, but there may be employed any other rubber meterial on which surface coating is possible by the secondary vulcanizing. Nevertheless silicon rubber is preferred in consideration of superior mass producibility and elastic characteristics.

The content of the resin particles is preferably within a range from 20 to 80 parts by weight with respect to 100 parts by weight of the rubber, since an amount less than 20 parts leads to an excessively thin surface coating, while an amount in excess of 80 parts will deteriorate the elasticity of the rubber matrix.

The present invention has been explained by examples thereof, but the present invention is not limited by such examples and is subject to any variation within the scope and spirit of the appended claims.

We claim:

1. A method for producing a cleaning blade, comprising:
    a first step for dispersing resin powder in a liquidous rubber material;
    a second step for molding said rubber material; and
    a third step for vulcanizing the molded rubber at a temperature higher than the softening point of said resin powder.

2. A method according to claim 1, further comprising a step for cutting an end of rubber between said second and third steps.

3. A method according to claim 1, wherein the molding temperature of said rubber material is lower than the softening point of said resin.

4. A method according to claim 1, wherein the molding temperature of said rubber material is lower than the melting point of said resin.

5. A method according to claim 1, wherein said rubber is silicon rubber.

6. A method according to claim 1, wherein said resin is crystalline.

7. A method according to claim 6, wherein said resin is polyvinylidene fluoride.

8. A method for producing a cleaning blade comprising:
    a first step for dispersing resin powder in a liquidous rubber material;
    a second step for molding said rubber material; and
    a third step for vulcanizing the molded rubber at a temperature higher than the melting point of said resin powder.

9. A method according to claim 8, further comprising a step for cutting an end of rubber between said second and third steps.

10. A method according to claim 8, wherein the molding temperature of said rubber material is lower than the softening point of said resin.

11. A method according to claim 8, wherein the molding temperature of said rubber material is lower than the melting point of said resin.

12. A method according to claim 8, wherein said rubber is silicon rubber.

13. A method according to claim 8, wherein said resin is crystalline.

14. A method according to claim 13, wherein said resin is polyvinylidene fluoride.

* * * * *

UNITED STATES PATENT AND TRADEMARK OFFICE
CERTIFICATE OF CORRECTION

PATENT NO. 5,204,034

Page 1 of 2

DATED : April 20, 1993

INVENTOR(S) Hiroshi Samsae, et al.

It is certified that error appears in the above-indentified patent and that said Letters Patent is hereby corrected as shown below:

On the title page, item:

[75] INVENTORS

"Moriyuki Yanai" should read --Noriyuki Yanai--.

COLUMN 1:

Line 59, "due" should read --due,--.
Line 60, "example" should read --example,--.
Line 68, "Besides" should read --Besides,--.

COLUMN 2:

Line 9, "However" should read --However,--.

COLUMN 6:

Table 1, "EX. 1 no lubri cant" should read --Ref. 1 Ex. 1 no lubri cant--.

UNITED STATES PATENT AND TRADEMARK OFFICE
CERTIFICATE OF CORRECTION

PATENT NO. : 5,204,034
DATED : April 20, 1993
INVENTOR(S) : Hiroshi Sasame, et al.

It is certified that error appears in the above-indentified patent and that said Letters Patent is hereby corrected as shown below:

COLUMN 7:

Line 11, "highter" should read --higher--.

Signed and Sealed this

Twenty-second Day of February, 1994

Attest:

BRUCE LEHMAN

Attesting Officer

Commissioner of Patents and Trademarks